(12) United States Patent
Krefting

(10) Patent No.: US 10,787,043 B2
(45) Date of Patent: Sep. 29, 2020

(54) INSERT FOR A PNEUMATIC TIRE

(71) Applicant: CushCore, LLC, Bend, OR (US)

(72) Inventor: Adam Krefting, Bend, OR (US)

(73) Assignee: CushCore, Inc., Bend, OR (US)

( * ) Notice: Subject to any disclaimer, the term of this patent is extended or adjusted under 35 U.S.C. 154(b) by 0 days.

(21) Appl. No.: 16/245,604

(22) Filed: Jan. 11, 2019

(65) Prior Publication Data

US 2019/0143763 A1 May 16, 2019

Related U.S. Application Data

(63) Continuation of application No. 15/348,662, filed on Nov. 10, 2016, now Pat. No. 10,286,736, which is a continuation-in-part of application No. 14/656,250, filed on Mar. 12, 2015, now Pat. No. 10,293,640.

(60) Provisional application No. 62/056,308, filed on Sep. 26, 2014, provisional application No. 62/257,548, filed on Nov. 19, 2015.

(51) Int. Cl.
*B60C 17/01* (2006.01)
*B60C 5/08* (2006.01)
*B60C 5/00* (2006.01)
*B60C 17/06* (2006.01)

(52) U.S. Cl.
CPC ............. *B60C 17/01* (2013.01); *B60C 5/002* (2013.01); *B60C 5/08* (2013.01); *B60C 17/065* (2013.01); *B60C 2200/10* (2013.01); *B60C 2200/12* (2013.01)

(58) Field of Classification Search
CPC ............ B60C 17/01; B60C 5/002; B60C 5/08
See application file for complete search history.

(56) References Cited

U.S. PATENT DOCUMENTS 4,592,403 A * 6/1986 Stein ..................... B60C 17/10
152/158
4,722,377 A * 2/1988 Dobson .................. B60C 7/105
152/158

FOREIGN PATENT DOCUMENTS

JP  2001 121907 A  5/2001
JP  2001121907 A * 5/2001

OTHER PUBLICATIONS

European Patent Office Examination Report, Application No. 15843697. 2-1012, dated May 31, 2019.

* cited by examiner

*Primary Examiner* — Jacob T Minskey
*Assistant Examiner* — Melody Tsui
(74) *Attorney, Agent, or Firm* — Hancock Hughey LLP

(57) ABSTRACT

An insert for a pneumatic tire including an annular member adapted to contact at least 10% of an interior surface of the pneumatic tire and provide an outward pressure thereagainst.

17 Claims, 5 Drawing Sheets

US 10,787,043 B2

INSERT FOR A PNEUMATIC TIRE

FIELD OF THE DISCLOSURE

The present disclosure relates to tires, and more particularly to an insert for a pneumatic tire.

RELATED ART

Pneumatic tires typically have two sidewalls interconnected by an outermost tread. Radially innermost portions of the sidewalls are seated against a rim, forming a closed interior volume of the tire. Prior to use, the interior volume is pressurized to provide resistance against deforming loads. In certain applications, the interior volume of the tire can be tubeless, i.e., the pressurized fluid within the interior volume directly pushes outward against the sidewalls. In other applications, the interior volume of the tire can further include an inflatable bladder to contain the pressurized fluid, i.e., the pressurized fluid does not directly contact the sidewalls of the tire.

Ideal tire pressure varies depending on application. For example, a pneumatic tire for use with a motorized vehicle, e.g., a motorcycle, may require an internal pressure of 12 pounds per square inch (PSI), whereas a tire for use with a high performance road bicycle may require may require an internal pressure in excess of 100 PSI. While such high pressures may provide increased rigidity to the sidewalls and tread, high pressures can simultaneously decrease tire traction and can result in increased transmission of vibration to a user, resulting in "stiff performance."

Run-flat tires, such as disclosed in U.S. Pat. No. 4,334,565 to L. Stokes, typically include an insert that extends laterally beyond a wheel rim to protect the rim in the event of tire depressurization. Upon depressurization, the insert protects the rim from contacting the road and allows the vehicle to continue to be driven at reduced speeds. Prior to depressurization, the insert provides no significant lateral support to the sidewall. Instead, the insert merely contacts the sidewall and provides a cushioning layer which insulates the wheel rim from experiencing a sharp impulse, or rim strike, as may occur for example during impacting with the road in the event of depressurization.

Similarly, while pinch puncture preventing devices, such as disclosed in U.S. Pat. No. 5,679,184, may include inserts to radially displace an inflatable bladder from contacting a rim, they fail to provide lateral support to the sidewall of the tire, negating some of the benefits associated with use of reduced internal pressure within the tire.

Accordingly, there is a need for a device that allows for operation of a vehicle with a reduced tire pressure while maintaining lateral stiffness and traction of the sidewalls and tread, respectively. Moreover, there is a need for such device which can simultaneously avoid the occurrence of pinch punctures within any internally positioned inflatable bladder or within the tire sidewall itself.

BRIEF DESCRIPTION OF THE DRAWINGS

Embodiments are illustrated by way of example and are not intended to be limited in the accompanying figures.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the pneumatic tire arts.

Figure 1:
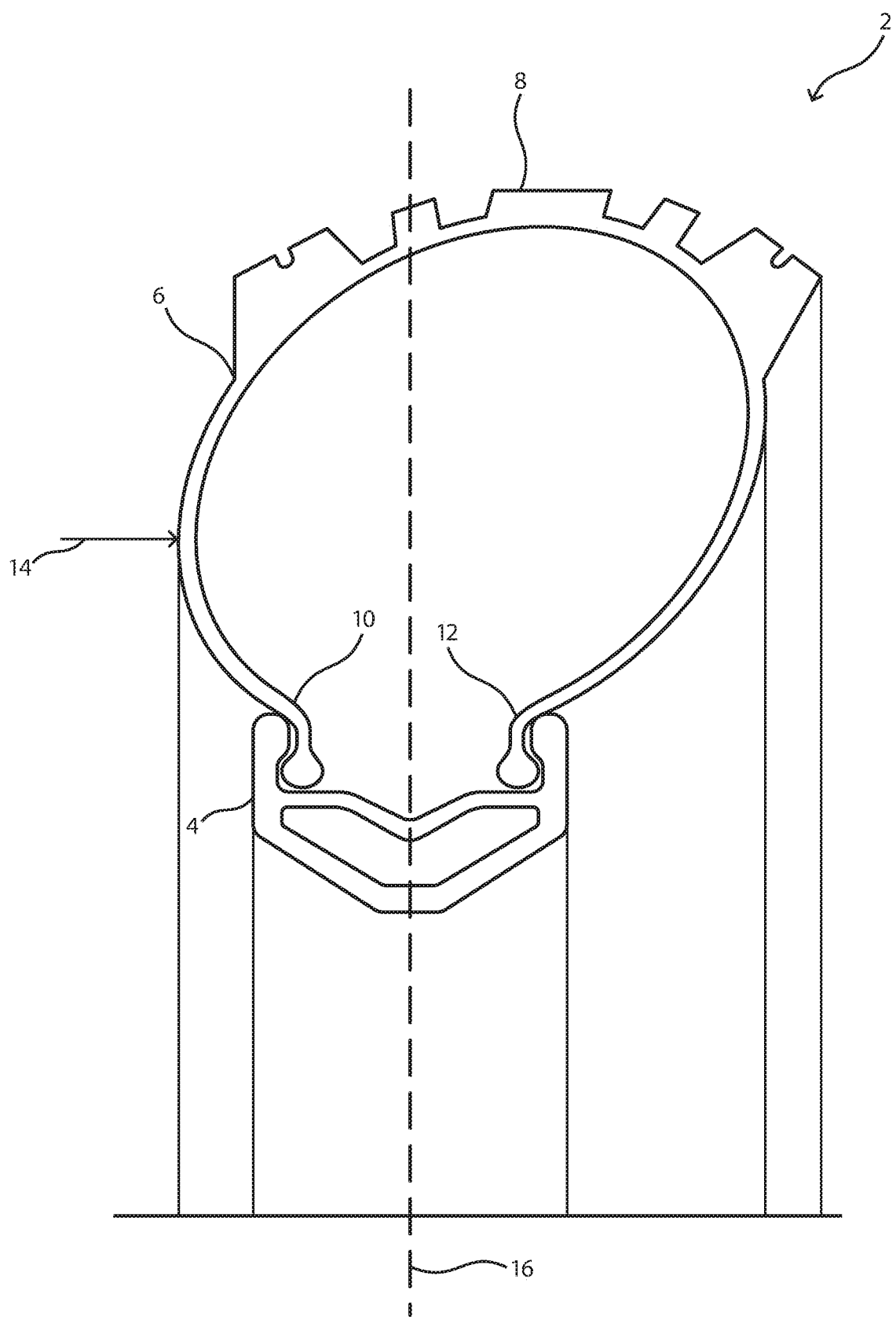
FIG. 1 includes a cross-sectional view of a known tire assembly undergoing lateral deflection.

FIG. 1 includes a cross sectional view of a known tire assembly 2 including a rim 4 and a tire 6. The tire 6 includes a tread 8 and two sidewalls 10 and 12. The tire assembly 2 may include an inflatable bladder pressing outward against the tread 8 and sidewalls 10 and 12 or operate without the inflatable bladder, rendering it tubeless. Such "tubeless" tire assemblies are typically operated at higher pressures (e.g., 45 PSI) in order to provide sufficient lateral stiffness to the sidewalls 10 and 12 and maintain the tire 6 in contact with the rim 4. This can result in reduced traction at the tread 8 and stiff performance of the tire assembly 2. To increase traction and soften vibrational harshness, internal pressure within the tire 6 can be reduced, or kept at a relatively low pressure. For example, the tire 6 may have a pressure rating (a maximum allowable pressure) of 45 PSI and an in-use (actual) pressure of 15 PSI. In this regard, the tire 6 can better flex to absorb shock and transmission of vibration through the sidewalls 10 and 12 while simultaneously maintaining increased contact between the tread 8 and the ground.

Upon introduction of a lateral loading force (as indicated by arrow 14) to an underinflated tire, e.g. a tire inflated below the pressure rating, the tire 6 may deflect laterally from center 16. Such lateral loading forces may occur, for example, during cornering, rapid changes in speed, or impact against a hard object, such as a rock. The resulting lateral instability of the sidewalls 10 and 12 can reduce torque transmission, accelerate tire wear and fatigue of the tire, result in a rapid depressurization condition or blowout, or worse, reduce steering responsiveness, potentially putting the vehicle operator in a state of peril.

Figure 2:
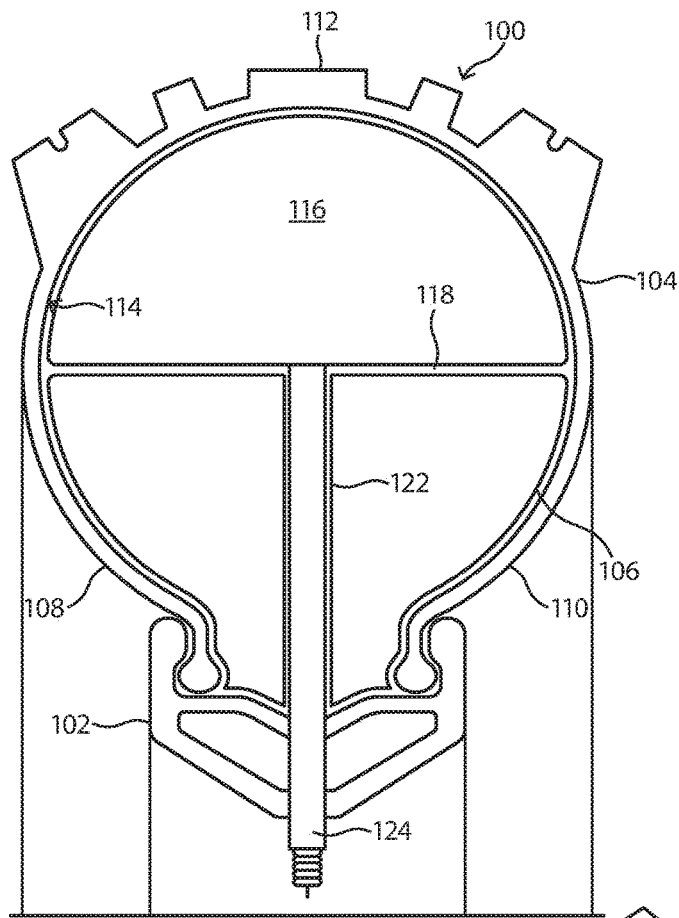
FIG. 2 includes a cross-sectional view of a tire assembly in accordance with an embodiment.

A tire assembly in accordance with one or more of the embodiments described herein can generally provide the advantages of a low pressure tire while avoiding the accompanying disadvantageous thereof. Referring now to FIG. 2, a tire assembly 100 in accordance with one or more of the embodiments described herein can generally include a pneumatic tire 104 and an annular member 106 disposed at least partially therein. The pneumatic tire 104 includes two opposing sidewalls 108 and 110 connected by a tread 112. In operation, an innermost portion of the sidewalls 108 and 110 can rest against a rim 102. The annular member 106 can rest against at least a portion of an interior surface 114 of the pneumatic tire 104 and can provide an outward force thereagainst. After reading this specification, skilled artisans will understand that the tire 104 may have any similar shape to that described above, and that the example is presented to improve understanding and not to limit the scope of the disclosure.

In an embodiment, the annular member 106 can contact at least 10% of the interior surface 114 of the tire 104. In further embodiments, the annular member can contact at least 15% of the interior surface, such as at least 20% of the interior surface, at least 25% of the interior surface, at least 30% of the interior surface, at least 35% of the interior surface, at least 40% of the interior surface, at least 45% of the interior surface, at least 50% of the interior surface, at least 55% of the interior surface, at least 60% of the interior surface, at least 65% of the interior surface, at least 70% of the interior surface, or even at least 75% of the interior surface. In yet further embodiments, the annular member can contact the tire 104 along no greater than 100% of the interior surface, such as less than 95% of the interior surface, less than 90% of the interior surface, less than 85% of the interior surface, or even less than 80% of the interior surface.

In a more particular embodiment, the annular member 106 can contact between 25% and 75% of the interior surface 114.

In a particular embodiment, the annular member 106 can contact the interior surface 114 in a continuous manner. As used herein, "continuous manner" refers to uninterrupted contact between an outer surface of the annular member and the interior surface of the tire along a contact interface formed therebetween. In this regard, the contact interface is devoid of channels, recesses, bumps, or indentations which form gaps against the interior surface of the tire.

The annular member 106 has a maximum radial height, as measured from an innermost surface to an outermost surface thereof in a direction normal to a central axis of the annular member 106. In an embodiment, the annular member 106 can be in contact with the interior surface 114 of the tire 104 along a radial height that is less than the maximum radial height of the annular member 106. In this regard, the radial height of the annular member 106 can be greater than a radial height of contact between the annular member 106 and the interior surface 114 of the tire 104. For example, in a particular embodiment, the annular member 106 can be in contact with the interior surface 114 along at least 25% of the maximum radial height of the annular member 106, such as along at least 50% of the maximum radial height of the annular member, along at least 75% of the maximum radial height of the annular member, or even along at least 95% of the maximum radial height of the annular member. In a further embodiment, the annular member 106 can be in contact with the interior surface 114 along no greater than 99.9% of the maximum radial height of the annular member 106, such as along no greater than 99% of the maximum radial height of the annular member, no greater than 98% of the maximum radial height of the annular member, no greater than 97% of the maximum radial height of the annular member, no greater than 96% of the maximum radial height of the annular member, or even no greater than 95% of the maximum radial height of the annular member. In a particular embodiment, the annular member 106 can be in contact with the interior surface 114 along 100% of the maximum radial height of the annular member 106.

In a more particular embodiment, the annular member 106 can be in contact with the interior surface 114 within a range between 75% and 100% of the maximum radial height of the annular member 106. This may reduce weight and size, which may be of particular concern in performance applications, such as racing, where even slight weight adjustments can affect outcome.

In the installed state, the annular member 106 can occupy at least 10% of an internal volume of the tire 104, such as at least 15% of the internal volume, at least 20% of the internal volume, at least 25% of the internal volume, at least 30% of the internal volume, at least 35% of the internal volume, at least 40% of the internal volume, at least 45% of the internal volume, at least 50% of the internal volume, at least 55% of the internal volume, at least 60% of the internal volume, at least 65% of the internal volume, or even at least 70% of the internal volume. In a further embodiment, the annular member 106 can occupy less than 100% of the internal volume, such as no greater than 99% of the internal volume, no greater than 95% of the internal volume, no greater than 90% of the internal volume, no greater than 85% of the internal volume, no greater than 80% of the internal volume, or even no greater than 75% of the internal volume.

In a more particular embodiment, the annular member 106 can occupy between 40% and 75% of the internal volume of the tire 104. In this regard, the annular member 106 may provide sufficient lateral stability with minimal additional and unnecessary weight.

In a particular embodiment, the annular member 106 can have a generally hemispherical cross-sectional shape when viewed along a plane extending from a central axis of the tire assembly 100. In such a manner, the annular member 106 can occupy less than the full internal volume of the tire 104 while providing a sufficient contact interface for an inflatable bladder, as discussed in greater detail below.

In accordance with at least one of the embodiments described herein, the annular member 106 can provide a pressure of at least 0.001 PSI against the interior surface 114 of the tire 104, as measured in an assembled, unloaded state.

In a further embodiment, the annular member 106 can provide a pressure of at least 0.01 PSI, such as at least 0.1 PSI, at least 0.5 PSI, at least 1 PSI, at least 5 PSI, at least 10 PSI, at least 25 PSI, or even at least 50 PSI against the interior surface 114 of the tire 104. As used herein, an "assembled, unloaded state" refers to post-installation of the tire with the rim, prior to providing a loading condition on the tread. For example, a tire in an assembled, unloaded state may be fully inflated but not in contact with the ground, e.g., the tire can freely spin. In another embodiment, the annular member 106 can provide no greater than 200 PSI against the interior surface 114 of the tire 104, such as no greater than 150 PSI, no greater than 125 PSI, or even no greater than 100 PSI against the interior surface 114 of the tire 104. The above described pressure can be measured at any location along the interior surface 114 of the tire 104 in a direction normal thereto at that location.

In an embodiment, the annular member 106 can have a generally polygonal cross-sectional shape when viewed along a plane extending from the central axis of the tire assembly 100. In a further embodiment, the annular member 106 can have a generally ellipsoidal cross-sectional shape when viewed along a plane extending from the central axis of the tire assembly 100. In yet another embodiment, the annular member 106 can have at least one polygonal portion and at least one ellipsoidal portion when viewed along a plane extending from the central axis thereof.

Figure 5:
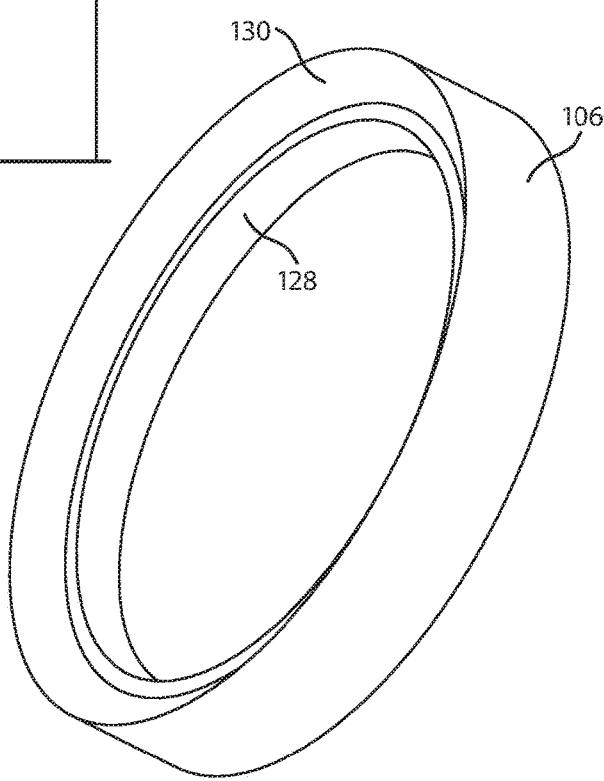
FIG. 5 includes a perspective view of an annular member in accordance with an embodiment.

In a particular embodiment, such as illustrated in FIGS. 2 and 5, the annular member 106 has a base portion 128 disposed adjacent to the rim 102 and an ellipsoidal portion 130 extending outward therefrom. The base portion 128 adjacent to the rim 103 may be contoured to accurately fit within the rim. The ellipsoidal portion may be contoured to accurately fit within the tire 104. This may allow the annular member 106 to accurately fit with both the non-ellipsoidal profile of the rim 102 and the ellipsoidal profile of the interior surface 114 of the tire 104.

In an alternate embodiment, the annular member need not have an accurate fit, particularly with respect to the rim. In a non-illustrated embodiment, the cross-sectional shape of the annular member can be different than the cross-sectional shape of the rim. For example, in a non-limiting embodiment, the innermost portion of the annular member may have a rounded contour while the rim has a generally rectangular contour. In another non-illustrated embodiment, the annular member can be spaced apart from the rim. In this regard, a gap can be formed between the rim and the innermost surface of the annular member. The gap can extend circumferentially around the rim such that the annular member is not in direct contact with any portion of the rim.

In an embodiment, the pressure exerted by the annular member 106 on the interior surface 114 of the tire 104 can be uniform, or substantially uniform, as measured along the sidewalls 108 and 110, i.e., the pressure is approximately equal along all contact points between the annular member 104 and the interior surface 114. As used herein, "the pressure is approximately equal along all contact points" refers to a maximum pressure deviation of no greater than 5 PSI along the contact interface between the annular member and the interior surface of the tire.

In a particular embodiment, uniform, or substantially uniform, pressure can be achieved by utilizing an annular member 106 that has a cross-sectional shape identical, or nearly identical, to the interior surface 114 of the tire 104 in the assembled, unloaded state. For example, the interior surface 114 can define a sidewall profile or shape that extends parallel, or generally parallel, with a lateral profile of the annular member 106 in the assembled, unloaded state. In such a manner, the annular member 104 is uniformly, or substantially uniformly, compressed in the assembled, unloaded state. A skilled artisan will understand that in practice exact uniformity is unachievable, and therefore will understand that manufacturing tolerances and variability may be acceptable under this embodiment.

In another particular embodiment, the annular member 106 can have a cross-sectional shape identical, or nearly identical, to the interior surface 114 of the tire 104 in the assembled, loaded state. As used herein, an "assembled, loaded state" refers to post-installation of the tire with the rim, after providing a loading condition on the tread, e.g., weight of the vehicle or weight of the vehicle and operator. For example, the interior surface 114 can define a sidewall profile or shape that extends parallel with a lateral profile of the annular member 106 in the assembled, loaded state. In such a manner, the annular member 104 is uniformly compressed in the assembled, loaded state.

Figure 6:
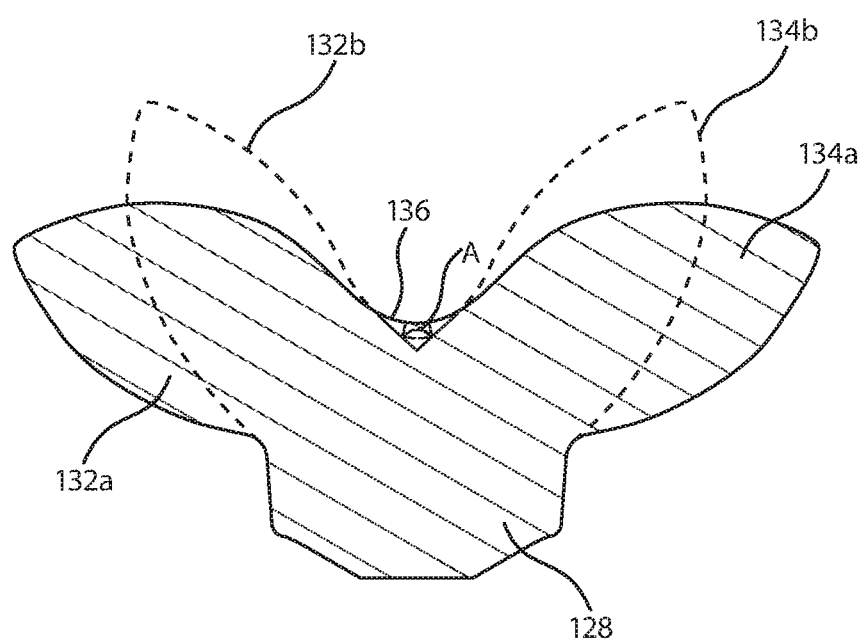
FIG. 6 includes a cross-sectional view of an annular member in accordance with an embodiment.

Referring to FIG. 6, and in accordance with a particular embodiment, the annular member 106 can have two lobes 132 and 134 projecting outward from the base portion 128. The lobes 132 and 134 may be similar in shape. That is, the lobes 132 and 134 may have similar cross-sectional profiles. In an embodiment, the lobes 132 and 134 may be reflectively symmetrical about a line intersecting the annular member 106 in a radial In the unloaded state, i.e., prior to installation within the tire 104, the lobes 132*a* and 134*a* can extend generally opposite one another. During loading conditions, e.g., during installation, the lobes 132*a* and 134*a* can deflect as illustrated by dashed lines 132*b* and 134*b*. The lobes 132*b* and 134*b* may provide an outward biasing force against the interior surface 114 of the tire 104. During operation, the lobes 132*b* and 134*b* may flex, or move, relative to each other such that constant, or nearly constant, outward force is applied against the interior surface 114.

In an embodiment, the lobes 132*b* and 134*b* can maintain contact with the interior surface 114 during flexing of the tire sidewalls 108 and 110. This can improve performance of the tire 104 and prevent occurrence of pinch punctures with the rim 102.

In an embodiment, the annular member 106 can further include an indent 136. The indent 136 may be centrally positioned between the lobes 132 and 134. In a particular embodiment, the indent 136 may be centrally disposed between the lobes 132 and 134. The indent 136 may permit a higher degree of lobe flexure. That is, the indent 136 may allow the lobes 132*a* and 134*a* to more easily flex inward upon installation. In an embodiment, the indent 136 can be arcuate when viewed in cross section. The arcuate indent 136 may have a radius of curvature of at least 1 mm, such as at least 2 mm, at least 3 mm, at least 4 mm, at least 5 mm, at least 10 mm, at least 20 mm, at least 30 mm, at least 40 mm, or even at least 50 mm. In an embodiment, the radius of curvature may be no greater than 100 cm, such as no greater than 50 cm, no greater than 25 cm, or even no greater than 10 cm. In another embodiment, the indent 136 can have a polygonal profile. For example, the indent 136 may be triangular, quadrilateral, a combination of straight line segments, a combination of arcuate line segments, or even a combination thereof.

In certain embodiments, the indent 136 may extend radially inward from an outermost point of the annular member 102 by at least 1 mm, such as at least 2 mm, at least 3 mm, at least 4 mm, at least 5 mm, at least 10 mm, at least 20 mm, at least 30 mm, at least 40 mm, or even at least 50 mm. In further embodiments, the indent 136 may extend radially inward no more than 500 mm, such as no more than 400 mm, no more than 300 mm, or even no more than 200 mm.

In an embodiment, the lobes 132a and 134a can define an angle therebetween which decreases upon installation (as illustrated by lobes 132b and 134b). In an embodiment, the angle decreases by at least 10%, such as by at least 15%, at least 20%, at least 25%, at least 30%, at least 35%, at least 40%, or even at least 45% upon installation with the tire 104. In another embodiment, the angle decreases by less than 100% upon installation with the tire 104.

Figure 3:
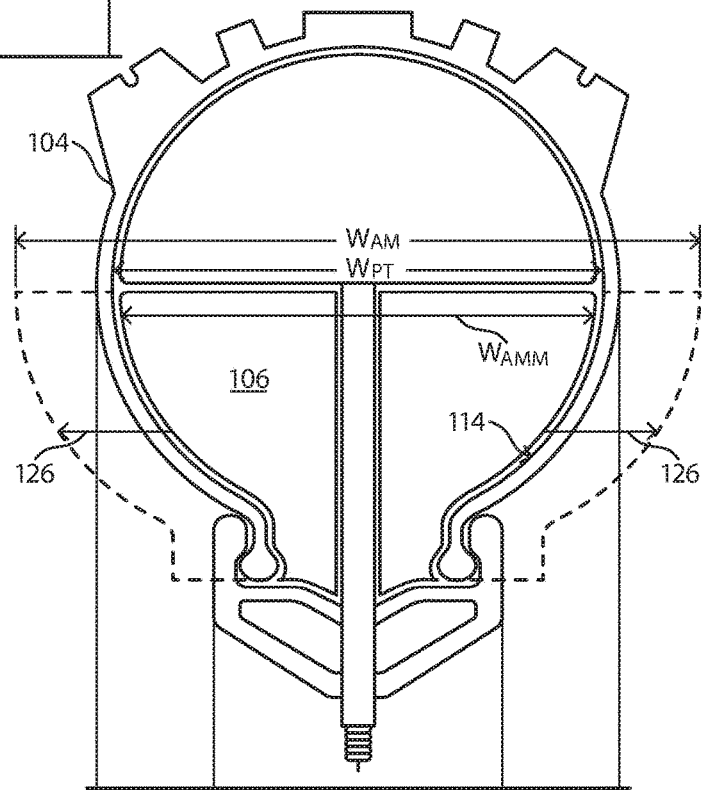
FIG. 3 includes a cross-sectional view of a tire assembly in accordance with an embodiment.

Referring to FIG. 3, in an embodiment, the annular member can have a preassembled width, $W_{AM}$, as measured at a location in a lateral direction, that is no less than a width, $W_{PT}$, of the interior surface 114 of the tire 104, as measured at the same location in a lateral direction. More particularly, $W_{AM}$ can be greater than 1.0 $W_{PT}$, such as at least 1.01 $W_{PT}$, at least 1.1 $W_{PT}$, at least 1.15 $W_{PT}$, or even at least 1.2 $W_{PT}$. Yet even more particularly, $W_{AM}$ can be no greater than 100 $W_{PT}$, such as no greater than 50, no greater than 10, no greater than 1.5 $W_{PT}$, no greater than 1.45 $W_{PT}$, no greater than 1.4 $W_{PT}$, no greater than 1.35 $W_{PT}$, no greater than 1.3 $W_{PT}$, or even no greater than 1.25 $W_{PT}$. One of ordinary skill will understand that the annular member operates in a state of compression when $W_{AM}$ is greater than $W_{PT}$.

In an embodiment, the width, $W_{AM}$, of the annular member 106 is less than an assembled width, $W_{AMM}$, of the annular member, as measured after installation with the tire 104. For example, $W_{AMM}$ can be less than 1.0 $W_{AM}$, such as no greater than 0.99 $W_{AM}$, no greater than 0.98 $W_{AM}$, no greater than 0.97 $W_{AM}$, no greater than 0.96 $W_{AM}$, no greater than 0.95 $W_{AM}$, no greater than 0.9 $W_{AM}$, no greater than 0.85 $W_{AM}$, no greater than 0.8 $W_{AM}$, no greater than 0.75 $W_{AM}$, no greater than 0.7 $W_{AM}$, no greater than 0.65 $W_{AM}$, or even no greater than 0.6 $W_{AM}$. In an embodiment, $W_{AMM}$ can be no less than 0.05 $W_{AM}$, such as at least 0.1 $W_{AM}$, or even at least 0.15 $W_{AM}$. Thus, the annular member 106 is preloaded to apply an outward lateral force against the interior surface 114 of the tire 104 upon installation.

In an embodiment, prior to assembly of the annular member 106 with the tire 104, each lateral profile of the annular member 106 can be offset from the sidewall profile of the interior surface 114 of the tire 104 (as indicated by line 126) by a distance of greater than 0.0 mm, such as by at least 0.5 mm, at least 1 mm, at least 2 mm, at least 3 mm, at least 4 mm, at least 5 mm, at least 6 mm, at least 7 mm, at least 8 mm, at least 9 mm, at least 10 mm, at least 15 mm, or even at least 20 mm. In a further embodiment, the lateral profile of the annular member can be offset from the sidewall profile of the tire by a distance of no greater than 100 mm, such as no greater than 75 mm, no greater than 50 mm, or even no greater than 25 mm. Dashed lines in FIG. 3 are intended to illustrate the annular member 106, in accordance with an embodiment, as seen prior to insertion into the tire 104.

To provide a preloaded lateral force against the interior surface 114 while facilitating relatively easy assemblage of the tire assembly 100, the annular member 106 can be formed from a compressible material. More particularly, the annular member 106 may be formed from a material that elastically deforms under loading conditions, allowing it to regain its initial shape after removal of the loading condition. Compressibility may offer several advantages, such as, for example: easier insertion of the annular member 106 into the interior volume of the tire 104; stretching and twisting of the annular member 106 during assembly and use; easier fitting of the annular member 106 around a rim of the tire; and easier securing of the sidewalls of the tire 104 into the rim 102.

In an embodiment, the annular member 106 can be formed from a material that can provide a pressure of at least 1 PSI upon a reduction in size by 25%, where the pressure is oriented in a direction generally opposite to the force causing the reduction in size. In a further embodiment, the annular member 106 can provide a pressure of at least 2 PSI upon reduction in size, by 25%, such as at least 3 PSI upon a reduction in size by 25%, at least 4 PSI upon a reduction in size by 25%, at least 5 PSI upon a reduction in size by 25%, at least 10 PSI upon a reduction in size by 25%, at least 25 PSI upon a reduction in size by 25%, or even at least 50 PSI upon a reduction in size by 25%. In yet a further embodiment, the annular member 106 can provide a pressure of no greater than 100 PSI upon a reduction in size by 25%, such as no greater than 90 PSI upon a reduction in size by 25%; no greater than 80 PSI upon a reduction in size by 25%, no greater than 70 PSI upon a reduction in size by 25%, or even no greater than 60 PSI upon a reduction in size by 25%.

In a particular embodiment, the annular member 106 can at least partially include a polymer, such as an elastomer. Exemplary elastomers include alkyl acrylate copolymer (ACM), polybutadiene (BR), isobutylene-isoprene copolymer (IIR), chlorobutyl (CIIR), chlorinated polyethylene (CPE), chlorosulphonated polyethylene (CSM), epichlorhydrin (CO), ethylene acrylic (AEM), ethylene propylene copolymer (EPM), ethylene-vinyl acetate (EVA), ethylene propylene diene monomer (EPDM), fluoroelastomers (FKM), hydrogenated nitrile rubber (HNBR), synthetic cis-polyisoprene (IR), cis-polyisoprene (NR), chloroprene (CR), perfluoroelastomers (FFKM), polynorbornene (PNB), polysulphide (TR), polyurethane (AU or PU), silicone and fluorosilicone (MQ, VMQ, PMQ, or FMVQ), styrene butadiene (SBR), polyethylene (PE), or tetra-fluoroethylene/propylene (FEPM). In a particular embodiment, PE or PU may be desirable for their rigidity and weight-reducing properties.

In an embodiment, the annular member 106 can include, or consist essentially of, a foam. More particularly, the foam can be closed-cell or open-cell foam. In a particular embodiment, the annular member 106 can include an integral skin foam, also known as a self-skinning foam. While not intended to limit the disclosure, it is believed that integral skin foam may provide an acceptable surface contact with the interior surface 114 of the tire 104 over a wide range of tire deflection.

In an embodiment, the annular member 106 can have a density, as measured under standard atmospheric room conditions, of less than 500 kg/m$^3$, such as less than 450 kg/m$^3$, less than 400 kg/m$^3$, less than 350 kg/m$^3$, less than 300 kg/m$^3$, less than 250 kg/m$^3$, less than 200 kg/m$^3$, less than 150 kg/m$^3$, or even less than 100 kg/m$^3$. In a further embodiment, the annular member 106 can have a density, as measured under standard conditions, of at least 5 kg/m$^3$, such as at least 10 kg/m$^3$, at least 25 kg/m$^3$, at least 50 kg/m$^3$, or even at least 75 kg/m$^3$.

In a particular embodiment, the annular member 106 can have a weight of less than 30 lbs., such as less than 15 lbs., less than 10 lbs., less than 7.5 lbs., less than 5 lbs., or even less than 2.5 lbs. In a further embodiment, the annular member 106 can have a weight of at least 0.1 lbs., such as at least 0.5 lbs., or even at least 1 lb. Weight may be of particular concern in performance applications, such as racing. Thus, in particular embodiments, the weight of the annular member 106 can be less than 2 lbs, such as less than 1 lb, or even less than 0.5 lbs.

In an embodiment, the annular member 106 can have a Shore A durometer of less than 85, such as no greater than 70, no greater than 60, no greater than 50, no greater than 40, or even no greater than 30. In further embodiments, the annular member 106 can have a Shore A durometer of no less than 0, such as no less than 10, or even no less than 25.

In another embodiment, the annular member 106 can have a Shore 00 durometer of between 10 and 100. For example, the annular member 106 can have a Shore 00 durometer of no less than 10, such as no less than 20, no less than 30, no less than 40, no less than 50, or even no less than 60. Moreover, the annular member 106 can have a Shore 00 durometer of no greater than 100, such as no greater than 90, or even no greater than 80.

In an alternate embodiment, the annular member 106 can include an inflatable bladder. The inflatable bladder can have an internal pressure of at least 1 PSI, such as at least 2 PSI, at least 3 PSI, at least 4 PSI, at least 5 PSI, at least 10 PSI, or even at least 25 PSI. The internal pressure of the inflatable bladder can be no greater than 150 PSI, such as no greater than 100 PSI, or even no greater than 50 PSI. Similar to the embodiments described above, the inflatable bladder may provide outward pressure against the interior surface 114 of the tire 104. In a more particular embodiment, the inflatable bladder can have a cross-sectional shape similar to the interior surface 114 of the tire 104 in the assembled, loaded or unloaded state.

In an embodiment, an intermediary layer (not illustrated) can be disposed between at least a portion of the annular member 106 and the interior surface 114 of the tire 104. In a particular embodiment, the intermediary layer can be independent of both the annular member and the tire 104. In an alternate embodiment, the intermediary layer can be integral to one of the annular member 106 or tire 104. The intermediary layer can include a skin, fabric, rubber, cloth, or other material. The intermediary layer can space apart at least a portion of the annular member 106 from the interior surface 114. In a particular embodiment, the intermediary layer can space apart the entire annular member 106 from the interior surface 114.

Referring again to FIG. 2, in accordance with one or more embodiments described herein, the tire assembly 100 can further include an inflatable bladder 116. In a more particular embodiment, the inflatable bladder 116 can be disposed adjacent to the annular member 106. In this regard, a contact interface 118 can be formed between the inflatable bladder 116 and the annular member 106. In an embodiment, at least a portion of the inflatable bladder 116 can be disposed radially outside of the annular member 106. In a more particular embodiment, all of the inflatable bladder 116 can be disposed radially outside of the annular member 106. In this regard, the contact interface 118 can be disposed along a radially outer surface of the annular member 106 and a radially inner surface of the inflatable bladder 116.

In accordance with one or more embodiments described herein, the inflatable bladder 116 does not significantly compress the annular member 106. Specifically, the inflatable bladder 116 does not significantly bend or otherwise distort the annular member 106. Moreover, the tire assembly 100 can be operated with or without the inflatable bladder 116. The inflatable bladder 116 provides minimal compressive loading against the annular member 106 in the assembled, unloaded state. Rather, the inflatable bladder 116 may permit increased internal pressure control within the tire 104 and may permit easier usage of the tire 104.

Figure 4:
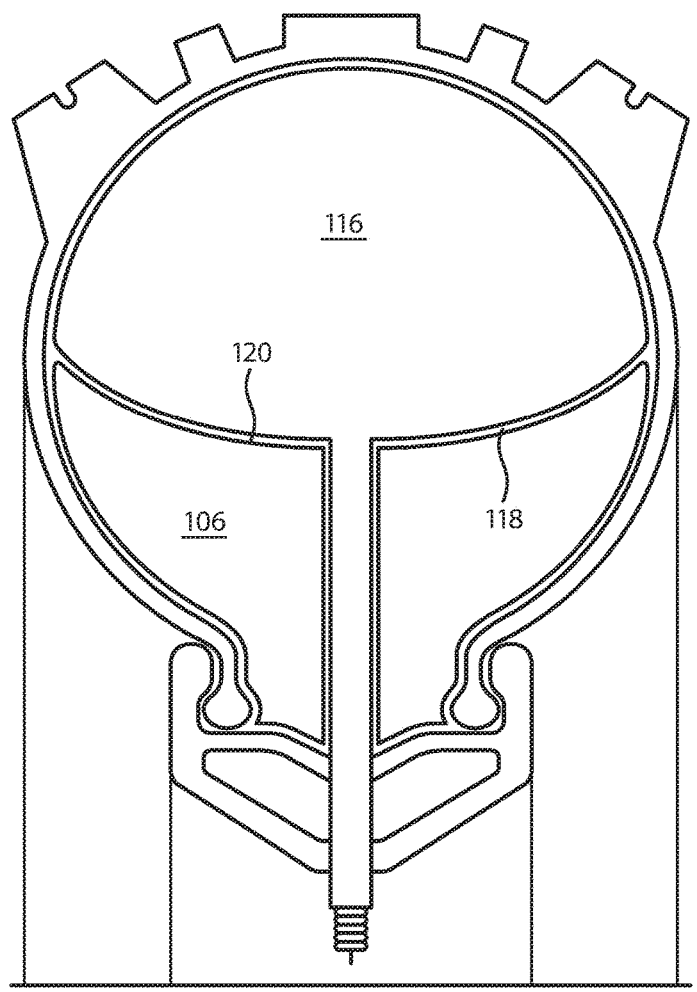
FIG. 4 includes a cross-sectional view of a tire assembly in accordance with an embodiment.

In an embodiment, the contact interface 118 between the annular member 106 and inflatable bladder 116 can be contoured. More particularly, the contact interface 118 can be ellipsoidal or polygonal. Yet more particularly, the contact interface 118 can be arcuate or concave, such as illustrated in FIG. 4. In this regard, a radially outer surface of the annular member 106 can include a circumferentially extending channel 120. The inflatable bladder 116 can be supported by and rest within the channel 120.

In a particular embodiment, the inflatable bladder 116 can be coupled to the annular member 106. In a more particular embodiment, the inflatable bladder 116 can be attached to the annular member 106. For example, in a particular embodiment the inflatable bladder 116 may be secured to the annular member 106 at one or more locations along the contact interface 118 by an adhesive. In a more particular embodiment, a continuous layer of adhesive can be disposed along the contact interface 118. In alternate embodiments, the inflatable bladder 116 may be mechanically secured to the annular member 106. For example, a portion of the annular member 106 may be crimped over a portion of the inflatable bladder 116. Alternatively, an attachment device such as a hook or a line may tie the annular member 106 to the inflatable bladder 116.

Referring again to FIG. 2, the annular member 106 may further include an opening 122 extending between the radially inner surface and the radially outer surface thereof. In an embodiment, the opening 122 can extend radially inward toward a central axis of the annular member 106. A valve stem 124 of the inflatable bladder 116 can extend through the opening 122, allowing an operator to access and pressurize the inflatable bladder 116. In an embodiment, the annular member 106 can have a radial height that is less than a length of the valve stem 124. For example, the valve stem 124 can be at least 105% the radial height of the annular member 106, such as at least 110%, at least 115%, at least 120%, or even at least 1:25%.

Figure 7:
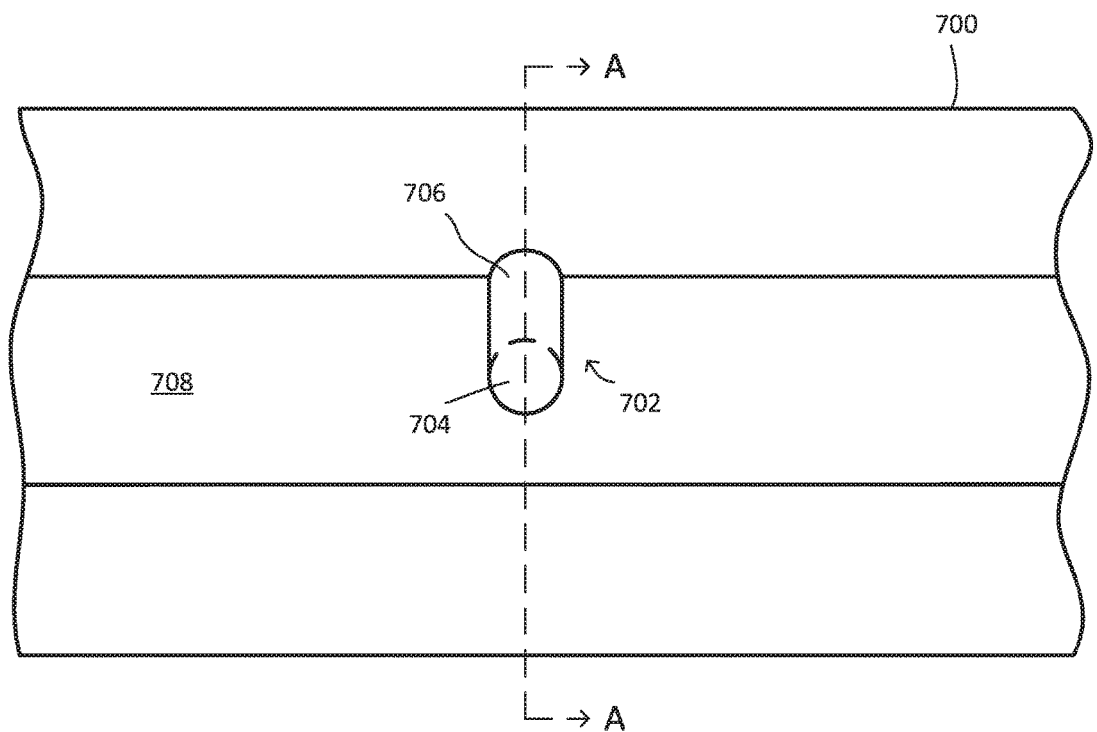
FIG. 7 includes a top elevation of an annular member in accordance with an embodiment.
Figure 8:
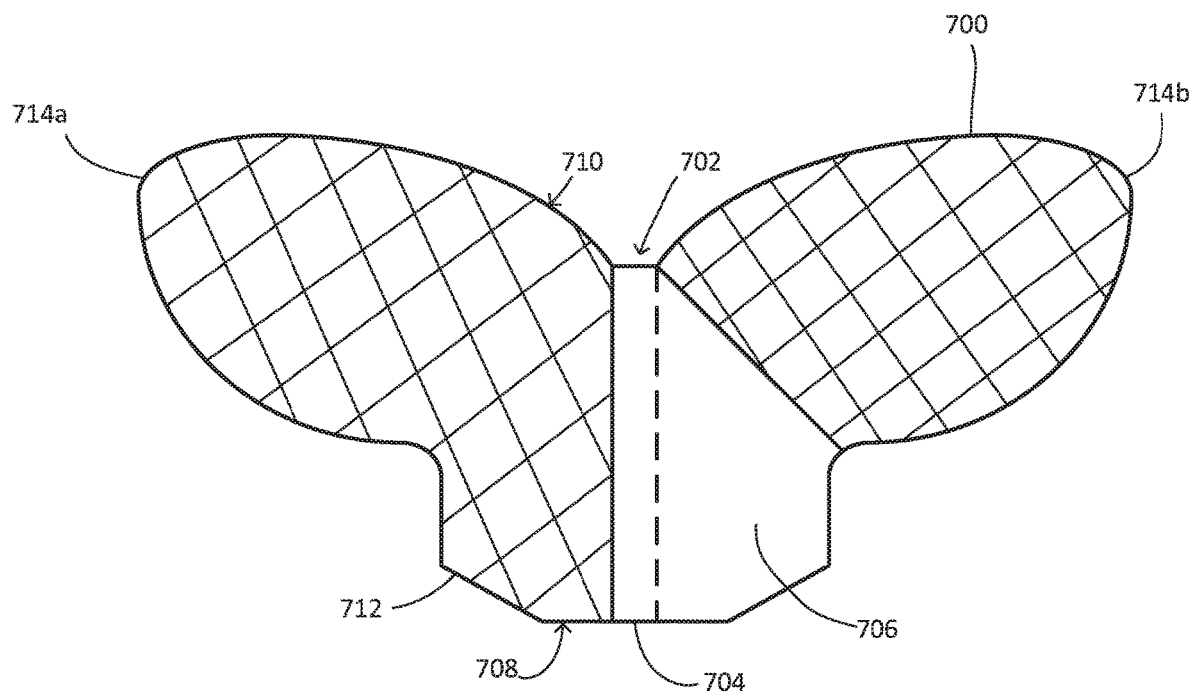
FIG. 8 includes a cross-sectional view of the annular member of FIG. 7 in accordance with an embodiment.

FIGS. 7 and 8 illustrate an embodiment of an annular member 700 including an opening 702 adapted to receive a valve stem of an inflatable bladder, thereby permitting passage of the valve stem through the annular member 700. In certain instances, installation of the valve stem through the annular member 700 may be difficult without inclusion of the opening 702.

For example, in an embodiment, installation of the annular member 700 and tire assembly onto the rim includes: installing the annular member 700 and inflatable bladder into the tire, installing a first sidewall of the tire onto the rim, installing the annular member 700 and inflatable bladder onto the rim, and installing the second sidewall of the tire onto the rim. In another instance, installation can include installing a first sidewall of the tire along the rim. The annular member 700 and inflatable bladder may then be inserted between the first and second sidewalls of the tire along an external surface of the rim. After the annular member 700 and inflatable bladder are properly seated against the rim, the second sidewall of the tire may be urged onto the rim.

Lack of opening 702 in the annular member 700 may render installation of the valve stem difficult, if not impossible. As described in greater detail below, the opening 702 may permit a pivoted installation of the valve stem, whereby the valve stem can be passed onto the rim at a non-perpendicular angle and subsequently reoriented, in situ, perpendicular to the external surface of the rim.

It is noted that the above described process is exemplary and that other processes and steps may be used. For example, in another embodiment, the annular member 700 can be fully seated on the rim, after which the inflatable bladder can be installed and the valve stem passed through the opening 702.

In an embodiment, the opening 702 may extend fully between radially inner 708 and outer 710 surfaces of the annular member 700. In a particular instance, the opening 702 may include a linear passageway 704, similar to opening 122 described above, and a slot 706 extending from the linear passageway 704 to expand the size of the opening 702 along inner surface 708 of the annular member 700. The slot 706 can transverse a portion of the annular member 700, extending from the linear passageway 704 to one or more locations.

As illustrated in FIG. 8, the slot 706 can extend primarily within the base portion 712 of the annular member 700. In other embodiments, the slot 706 can extend into one or both of the lobes 714a and 714b. That is, the slot 706 can be larger so as to extend further into and through one or both of the lobes 714a or 714b. It is believed that the use of an opening 702 including a slot 706 extending from a linear passageway 704 may reduce installation time while allowing more favorable angular positioning of the valve stem, thus reducing potential damage to the inflatable bladder and valve stem.

In an embodiment, such as illustrated in FIG. 7, the slot 706 may lie along a line that is parallel with a central axis of the annular member 700. In another embodiment, the slot 706 may lie along a line that is offset from the central axis. That is, the slot 706 may be offset from the central axis by at least 1°, at least 5°, at least 10°, or even at least 25°. In yet a further embodiment, the slot 706 may be oriented parallel, or generally parallel, with a circumferential length of the annular member 700. The slot 706 may permit temporary storage of the valve stem during installation, after which the valve stem may be reoriented perpendicular to an external surface of the rim and through the rim opening. That is, the valve stem may be bent into the opening 702 such that an exposed length of the valve stem during installation is less than an exposed length of the valve stem in the installed state. In an embodiment, at least 1% of the installed, visible length of the valve stem may be hidden within the opening during installed. In further embodiments, at least 2% of the installed, visible length of the valve stem may be hidden within the opening during installed, at least 5% of the installed, visible length of the valve stem may be hidden within the opening during installed, at least 10% of the installed, visible length of the valve stem may be hidden within the opening during installed, at least 25% of the installed, visible length of the valve stem may be hidden within the opening during installed, or at least 50% of the installed, visible length of the valve stem may be hidden within the opening during installed. In a particular instance, the entire valve stem, or substantially all of the valve stem, may be disposed within the opening 702 during installation.

The opening 702 may have a catch or feature which holds the valve stem within the opening 702 during installation. Alternatively, a user may hold the valve stem within the opening 702 during installation by applying pressure (e.g., a finger generated pressure) to the valve stem.

In a particular embodiment, the opening 702 can have an ovular profile as viewed from a top view. In other embodiments, the opening 702 can have a shape including polygonal portions, arcuate portions, or a combination thereof as viewed from a top view. In a particular instance, the center of the linear passageway 704 can be disposed at a central location (e.g., between opposite sides) of the annular member 700 with the slot extending outward toward an axial side thereof. In such a manner, the valve stem can be installed through a centrally disposed rim opening. Offsetting the central location of the linear passageway 704 may be desirable for applications where the rim opening is not centrally located along the rim or where an unusual angle or shape of the rim opening requires a non-perpendicular valve stem orientation.

In an embodiment, the slot can extend from the linear passageway in two directions, thus forming two slots, or one continuous slot extending from different locations of the linear passageway, within the annular member 700. The two slots can extend from the linear passageway at any relative angle with respect to one another. In a particular embodiment, the slots can extend in opposite directions, separating them by 180°. The slots can have the same or different lengths.

A benefit of at least one of the embodiments described herein is the ability to pressurize the inflatable bladder 116 to a lower pressure than typically allowable. Unlike with traditional tire assemblies (FIG. 1), assemblies in accordance with embodiments described herein can operate with lower internal pressures while maintaining sidewall rigidity. As a result, the inflatable bladder 116 can have an internal pressure of less than 150 PSI, such as less than 100 PSI, or even less than 75 PSI. In an embodiment, the inflatable bladder 116 can have an internal pressure of no less than 1 PSI, such as no less than 2 PSI, no less than 3 PSI, no less than 4 PSI, no less than 5 PSI, no less than 10 PSI, no less than 20 PSI, no less than 30 PSI, no less than 40 PSI, no less than 50 PSI, or even no less than 60 PSI. In a more particular embodiment, the inflatable bladder 116 can have an internal pressure in a range between and including 5 PSI and 20 PSI.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1. An insert for a pneumatic tire comprising:
an annular member adapted to contact at least 10% of an interior surface of the pneumatic tire and provide an outward pressure thereagainst.

Embodiment 2. An insert for a pneumatic tire comprising:
an annular member adapted to contact at least 10% of an interior surface of the pneumatic tire and provide an outward pressure thereagainst; and
an inflatable bladder disposed adjacent to the annular member.

Embodiment 3. A tire assembly comprising:
a pneumatic tire having an interior surface;
an annular member contacting at least 10% of the interior surface and providing an outward pressure thereagainst.

Embodiment 4. The insert or tire assembly according to any one of the preceding embodiments, wherein the annular member contacts the interior surface of the pneumatic tire along at least 15% of the interior surface, such as along at least 20% of the interior surface, at least 25% of the interior surface, at least 30% of the interior surface, at least 35% of the interior surface, at least 40% of the interior surface, at least 45% of the interior surface, at least 50% of the interior surface, at least 55% of the interior surface, at least 60% of the interior surface, at least 65% of the interior surface, at least 70% of the interior surface, or even at least 75% of the interior surface.

Embodiment 5. The insert or tire assembly according to any one of the preceding embodiments, wherein the annular member contacts the interior surface of the pneumatic tire along no greater than 100% of the interior surface, such as less than 95% of the interior surface, less than 90% of the interior surface, less than 85% of the interior surface, or even less than 80% of the interior surface.

Embodiment 6. The insert or tire assembly according to any one of the preceding embodiments, wherein the annular member contacts the interior surface of the pneumatic tire in a continuous manner.

Embodiment 7. The insert or tire assembly according to any one of the preceding embodiments, wherein the annular member provides an even pressure against the interior surface.

Embodiment 8. The insert or tire assembly according to any one of the preceding embodiments, wherein the pressure is directed away from the annular member.

Embodiment 9. The insert or tire assembly according to any one of the preceding embodiments, wherein the pressure is directed in a lateral direction.

Embodiment 10. The insert or tire assembly according to any one of the preceding embodiments, wherein, in an assembled, unloaded state, the pressure is at least 0.001 PSI, such as at least 0.01 PSI, at least 0.1 PSI, at least 0.5 PSI, at least 1 PSI, at least 5 PSI, at least 10 PSI, at least 25 PSI, or even at least 50 PSI.

Embodiment 11. The insert or tire assembly according to any one of the preceding embodiments, wherein, in an assembled, unloaded state, the pressure is no greater than 200 PSI, such as no greater than 150 PSI, no greater than 125 PSI, or even no greater than 100 PSI.

Embodiment 12. The insert or tire assembly according to any one of the preceding embodiments, wherein the annular member is in contact with the interior surface of the pneumatic tire along at least 25% of a radial height of the annular member, such as along at least 50% of the radial height of the annular member, along at least 75% of the radial height of the annular member, or even along at least 95% of the radial height of the annular member.

Embodiment 13. The insert or tire assembly according to any one of the preceding embodiments, wherein the annular member is in contact with the interior surface of the pneumatic tire along no greater than 100% of the radial height of the annular member.

Embodiment 14. The insert or tire assembly according to any one of the preceding embodiments, wherein the pneumatic tire defines a volume, and wherein the annular member is adapted to occupy at least 10% of the volume, such as at least 15% of the volume, at least 20% of the volume, at least 25% of the volume, at least 30% of the volume, at least 35% of the volume, at least 40% of the volume, at least 45% of the volume, at least 50% of the volume, at least 55% of the volume, at least 60% of the volume, at least 65% of the volume, or even at least 70% of the volume.

Embodiment 15. The insert or tire assembly according to any one of the preceding embodiments, wherein the pneumatic tire defines a volume, and wherein the annular member is adapted to occupy no greater than 99% of the volume, such as no greater than 95%, no greater than 90% of the volume; no greater than 85% of the volume, no greater than 80% of volume, or even no greater than 75% of the volume.

Embodiment 16. The insert or tire assembly according to any one of the preceding embodiments, further comprising an intermediary layer disposed between at least a portion of the annular member and the interior surface of the pneumatic tire.

Embodiment 17. The insert or tire assembly according to any one of the preceding embodiments, wherein the annular member has a generally hemispherical shape when viewed along a plane extending from a central axis of the annular member.

Embodiment 18. The insert or tire assembly according to any one of the preceding embodiments, wherein at least a portion of the annular member has a polygonal shape when viewed along a plane extending from a central axis of the annular member.

Embodiment 19. The insert or tire assembly according to any one of the preceding embodiments, wherein the annular member has a width, $W_{AM}$, as measured at a first location in a lateral direction, wherein an interior volume of the pneumatic tire has a width, $W_{PT}$, as measured at the first location in a lateral direction, and wherein $W_{AM}$ is no less than $W_{PT}$ as measured prior to insertion of the annular member into the interior volume of the pneumatic tire such that the annular member contacts the interior surface of the pneumatic tire.

Embodiment 20. The insert or tire assembly according to embodiment 19, wherein $W_{AM}$ is at least 1.0 $W_{PT}$, such as at least 1.01 $W_{PT}$, at least 1.1 $W_{PT}$, at least 1.15 $W_{PT}$, or even at least 1.2 $W_{PT}$.

Embodiment 21. The insert or tire assembly according to any one of embodiments 19 and 20, wherein $W_{AM}$ is no greater than 100 $W_{PT}$, such as no greater than 50, no greater than 10, no greater than 1.5 $W_{PT}$, no greater than 1.45 $W_{PT}$, no greater than 1.4 $W_{PT}$, no greater than 1.35 $W_{PT}$, no greater than 1.3 $W_{PT}$, or even no greater than 1.25 $W_{PT}$.

Embodiment 22. The insert or tire assembly according to any one of the preceding embodiments, wherein the annular member exerts a pressure against the interior surface of the pneumatic tire in an assembled, unloaded state.

Embodiment 23. The insert or tire assembly according to any one of the preceding embodiments, wherein the interior surface of the pneumatic tire defines a sidewall profile, wherein the annular member defines a lateral profile, and wherein the lateral profile extends parallel with the sidewall profile.

Embodiment 24. The insert or tire assembly according to embodiment 23, wherein the lateral profile is offset from the sidewall profile by greater than 0.0 mm, such as by at least 0:5 mm, at least 1 mm, at least 2 mm, at least 3 mm, at least 4 mm, at least 5 mm, at least 6 mm, at least 7 mm, at least 8 mm, at least 9 mm, at least 10 mm, at least 15 mm, or even at least 20 mm.

Embodiment 25. The insert or tire assembly according to any one of embodiments 23 and 24, wherein the lateral profile is offset from the sidewall profile by no greater than 100 mm, such as no greater than 75 mm, no greater than 50 mm, or even no greater than 25 mm.

Embodiment 26. The insert or tire assembly according to any one of the preceding embodiments, wherein the annular member has an initial width, $W_{AM}$, as measured prior to installation with a pneumatic tire, wherein the annular member has a modified width, $W_{AMM}$, as measured after installation with the pneumatic tire, and wherein $W_{AMM}$ is less than $W_{AM}$.

Embodiment 27. The insert or tire assembly according to any one of the preceding embodiments, wherein the annular member is adapted to extend radially around a rim of a wheel.

Embodiment 28. The insert or tire assembly according to embodiment 27, wherein at least a portion of the annular member is adapted to contact the rim.

Embodiment 29. The insert or tire assembly according to any one of the preceding embodiments, wherein the annular member comprises a radially inner surface, a radially outer surface, and first and second opposing lateral surfaces each extending between the radially inner and radially outer surfaces.

Embodiment 30. The insert or tire assembly according to embodiment 29, wherein the radially inner surface contacts a rim of a wheel.

Embodiment 31. The insert or tire assembly according to any one of the preceding embodiments, wherein the annular member comprises, or consists essentially of, a compressible material.

Embodiment 32. The insert or tire assembly according to any one of the preceding embodiments, wherein the annular member elastically deforms under a loading condition.

Embodiment 33. The insert or tire assembly according to any one of the preceding embodiments, wherein the annular member comprises, or consists essentially of, a polymer, such as a polyurethane or a polystyrene.

Embodiment 34. The insert or tire assembly according to any one of the preceding embodiments, wherein the annular member comprises, or consists essentially of, a rubber.

Embodiment 35. The insert or tire assembly according to any one of the preceding embodiments, wherein the annular member comprises, or consists essentially of, a foam rubber.

Embodiment 36. The insert or tire assembly according to any one of the preceding embodiments, wherein the annular member comprises, or consists essentially of, a foam.

Embodiment 37. The insert or tire assembly according to embodiment 36, wherein the foam comprises, or consists essentially of, an open- or closed-cell foam.

Embodiment 38. The insert or tire assembly according to embodiment 36, wherein the foam comprises, or consists essentially of an integral skin foam.

Embodiment 39. The insert or tire assembly according to any one of the preceding embodiments, wherein the annular member has a density, as measured under standard room conditions, of less than 500 kg/m$^3$, such as less than 450 kg/m$^3$, less than 400 kg/m$^3$, less than 350 kg/m$^3$, less than 300 kg/m$^3$, less than 250 kg/m$^3$, less than 200 kg/m$^3$, less than 150 kg/m$^3$, or even less than 100 kg/m$^3$.

Embodiment 40. The insert or tire assembly according to any one of the preceding embodiments, wherein the annular member has a density, as measured under standard room conditions, of at least 5 kg/m$^3$, such as at least 10 kg/m$^3$, at least 25 kg/m$^3$, at least 50 kg/m$^3$, or even at least 75 kg/m$^3$.

Embodiment 41. The insert or tire assembly according to any one of the preceding embodiments, wherein the annular member weighs less than 10 lbs, such as less than 7.5 lbs, less than 5 lbs, or even less than 2.5 lbs.

Embodiment 42. The insert or tire assembly according to any one of the preceding embodiments, wherein the annular member weighs at least 0.1 lbs, such as at least 0.5 lbs, or even at least 1 lb.

Embodiment 43. The insert or tire assembly according to any one of the preceding embodiments, wherein the annular member comprises a material having less than an 85 Shore A durometer, such as no greater than a 70 Shore A durometer, no greater than a 60 Shore A durometer, no greater than a 50 Shore A durometer, no greater than a 40 Shore A durometer, or even no greater than a 30 Shore A durometer.

Embodiment 44. The insert or tire assembly according to any one of the preceding embodiments, wherein the annular member comprises a material having no less than a 0 Shore A durometer, such as no less than a 10 Shore A durometer, or even no less than a 25 Shore durometer.

Embodiment 45. The insert or tire assembly according to any one of embodiments 1-42, wherein the annular member comprises a material having a Shore 00 durometer of no less than 10, such as no less than 20, no less than 30, no less than 40, no less than 50, or even no less than 60.

Embodiment 46. The insert or tire assembly according to any one of embodiments 1-42 and 45, wherein the annular member comprises a material having a Shore 00 durometer of no greater than 100, such as no greater than 90, or even no greater than 80.

Embodiment 47. The insert or tire assembly according to any one of the preceding embodiments, wherein the annular member provides a pressure of at least 1 PSI upon a reduction in size by 25%, such as at least 2 PSI upon a reduction in size by 25%, at least 3 PSI upon a reduction in size by 25%, at least 4 PSI upon a reduction in size by 25%, at least 5 PSI upon a reduction in size by 25%, at least 10 PSI upon a reduction in size by 25%, at least 25 PSI upon a reduction in size by 25%, or even at least 50 PSI upon a reduction in size by 25%.

Embodiment 48. The insert or tire assembly according to any one of the preceding embodiments, wherein the annular member provides a pressure of no greater than 100 PSI upon a reduction in size by 25%, such as no greater than 90 PSI upon a reduction in size by 25%, no greater than 80 PSI upon a reduction in size by 25%, no greater than 70 PSI upon a reduction in size by 25%, or even no greater than 60 PSI upon a reduction in size by 25%.

Embodiment 49. The insert or tire assembly according to any one of embodiments 1-35, wherein the annular member comprises an inflatable bladder.

Embodiment 50. The insert or tire assembly according to embodiment 49, wherein the inflatable bladder is adapted to have an internal pressure of at least 1 PSI, such as at least 2 PSI, at least 3 PSI, at least 4 PSI, at least 5 PSI, at least 10 PSI, or even at least 25 PSI.

Embodiment 51. The insert or tire assembly according to any one of embodiments 49 and 50, wherein the inflatable bladder is adapted to have an internal pressure of no greater than 150 PSI, such as no greater than 100 PSI, or even no greater than 50 PSI.

Embodiment 52. The insert or tire assembly according to any one of embodiments 1 and 3-51, further comprising an inflatable bladder adapted to be disposed in the pneumatic tire.

Embodiment 53. The insert or tire assembly according to embodiment 2 and 52, wherein at least a portion of the inflatable bladder is disposed radially outside of the annular member.

Embodiment 54. The insert or tire assembly according to any one of embodiments 2, 52 and 53, wherein all of the inflatable bladder is disposed radially outside of the annular member.

Embodiment 55. The insert or tire assembly according to any one of embodiments 2 and 52-54, wherein at least a portion of bladder contacts the annular member.

Embodiment 56. The insert or tire assembly according to any one of embodiments 2 and 52-55, wherein the inflatable bladder contacts the annular member along an inner surface of the inflatable bladder.

Embodiment 57. The insert or tire assembly according to any one of embodiments 2 and 52-56, wherein a volume of the pneumatic tire is at least 90% occupied by a combination of the annular assembly and the inflatable bladder, such as at least 95% occupied, or even at least 99% occupied.

Embodiment 58. The insert or tire assembly according to any one of embodiments 2 and 52-57, wherein the annular member comprises a circumferentially extending channel disposed along a radially outer surface, and wherein the inflatable bladder is adapted to be disposed at least partially in the channel.

Embodiment 59. The insert or tire assembly according to embodiment 58, wherein the channel is arcuate.

Embodiment 60. The insert or tire assembly according to any one of embodiments 58 and 59, wherein the channel comprises a concave surface.

Embodiment 61. The insert or tire assembly according to any one of embodiments 2 and 52-60, wherein the inflatable bladder is coupled to the annular member.

Embodiment 62. The insert or tire assembly according to any one of embodiments 2 and 52-61, wherein the inflatable bladder is attached to the annular member.

Embodiment 63. The insert or tire assembly according to any one of embodiments 2 and 52-62, wherein the inflatable bladder is adhered to the annular member.

Embodiment 64. The insert or tire assembly according to any one of embodiments 2 and 52-63, wherein the inflatable bladder has an internal pressure of no greater than 150 PSI, such as no greater than 125 PSI, no greater than 100 PSI, no greater than 90 PSI, no greater than 80 PSI, or even no greater than 70 PSI.

Embodiment 65. The insert or tire assembly according to any one of embodiments 52-64, wherein the inflatable bladder is adapted to have an internal pressure of no less than 1 PSI, such as no less than 5 PSI, no less than 10 PSI, no less than 20 PSI, no less than 30 PSI, no less than 40 PSI, no less than 50 PSI, or even no less than 60 PSI.

Embodiment 66. The insert or tire assembly according to any one of embodiments 2 and 52-65, wherein the inflatable bladder further comprises a valve stem extending from the inflatable bladder.

Embodiment 67. The insert or tire assembly according to embodiment 66, wherein the valve stem extends radially inward toward a central axis of the annular member.

Embodiment 68. The insert or tire assembly according to any one of embodiments 66 and 67, wherein the valve stem extends through the annular member.

Embodiment 69. The insert or tire assembly according to any one of embodiments 66-68, wherein a length of the valve stem is greater than a radial height of the annular member.

Embodiment 70. The insert or tire assembly according to any one of embodiments 66-69, wherein a length of the valve stem is at least 105% of a radial height of the annular member, such as at least 110%, at least 115%, at least 120%, or even at least 125%.

Embodiment 71. The insert or tire assembly according to any one of the preceding claims, wherein the annular member comprises: a base portion; a first lobe extending from the base portion; and a second lobe extending from the base portion, wherein the first and second lobes are adapted to flex relative to the base portion such than an angle between the first and second lobes decreases upon installation.

Embodiment 72. The insert or tire assembly according to embodiment 71, wherein the first and second lobes define an angle therebetween, and wherein the angle decreases upon installation of the annular member with the tire.

Embodiment 73. The insert or tire assembly according to any one of embodiments 71 and 72, wherein the angle decreases by at least 10%, such as by at least 15%, at least 20%, at least 25%, at least 30%, at least 35%, at least 40%, or even at least 45% upon installation with the tire.

Embodiment 74. The insert or tire assembly according to any one of embodiments 71-73, wherein the angle decreases by less than 100% upon installation with the tire.

Embodiment 75. A method or assembling a tire assembly comprising:

providing a wheel having a rim, an annular member according to any one of the preceding embodiments, and a pneumatic tire having an interior surface;

installing the annular member at least partially within the pneumatic tire; and fitting the annular member and pneumatic tire around the rim.

Embodiment 76. The method according to embodiment 75, further comprising installing an inflatable bladder in the pneumatic tire.

Embodiment 77. The method according to embodiment 76, wherein the step of installing the inflatable bladder is performed such that the inflatable bladder is disposed radially between the annular member and a tread of the pneumatic tire.

Embodiment 78. The method according to any one of embodiments 75-77, further comprising at least partially inflating the inflatable bladder.

Embodiment 79. The method according to embodiment 78, wherein the inflatable bladder is at least partially inflated after installation within the pneumatic tire.

Embodiment 80. The insert, tire assembly, or method according to any one of the preceding embodiments, wherein the annular member comprises an opening extending from a radially outside surface of the annular member to a radially inner surface of the annular member.

Embodiment 81. The insert, tire assembly, or method according to embodiment 80, wherein the opening comprises a passageway and a slot extending from the passageway, wherein the slot has a widest dimension along the radially outer surface, wherein a largest dimension of the slot at the radially inner surface is less than a largest dimension of the slot at the radially outer surface.

Embodiment 82. The insert, tire assembly, or method according to any one of embodiments 80 and 81, wherein the opening has a generally arcuate profile as viewed perpendicular to the radially outside surface of the annular member, wherein the opening has a generally polygonal profile as viewed perpendicular to the radially outside surface of the annular member, or wherein the opening has arcuate and polygonal portions as viewed perpendicular to the radially outside surface of the annular member.

Embodiment 83. The insert, tire assembly, or method according to any one of embodiments 80-82, wherein the opening is adapted to accommodate the valve stem such that a greater length of the valve stem is disposed in the opening during installation than in the installed state.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

The invention claimed is:

1. An insert for a pneumatic tire assembly comprising:
a tire mounted on a rim, the tire having opposed sidewalls interconnected by a tread portion and the tire defining an interior volume with a width $W_{PT}$ and an interior surface;
an annular member having a base portion, an outer portion and opposed side portions, wherein the annular member is inserted into the interior volume of the tire so that there is an empty space between the outer portion of the annular member and the interior surface of the tire at the tread portion and there is an area of contact between the opposed side portions of the annular member and the respective opposed sidewalls of the tire;
wherein the annular member has a width $W_{AM}$ that is greater than $W_{PT}$ as measured prior to insertion of the annular member into the interior volume of the tire, and the annular member exerts an outward pressure against the tire over the area of contact between the opposed side portions of the annular member and the respective opposed sidewalls of the tire.

2. The insert according to claim 1 in which the contact area is less than 80 percent of the interior surface of the tire after insertion of the annular member into the interior volume of the tire.

3. The insert according to claim 2 in which $W_{AM}$ is greater than $W_{PT}$ over the entire contact area prior to insertion of the annular member into the interior volume of the tire.

4. The insert according to claim 3 in which annular member comprises a compressible material and the annular member is compressed after insertion into the interior volume of the tire so that the opposed side portions exert outwardly directed pressure against the opposed sidewalls of the tire and such that the insert stabilizes the tire sidewalls.

5. The insert according to claim 4 wherein, in an assembled, unloaded state, the outwardly directed pressure is at least 0.1 PSI.

6. The insert according to claim 5 in which the annular member defines a concave surface in the direction of the base portion of the annular member.

7. The insert according to claim 1 wherein $W_{AM}$ is at least 1.01 $W_{PT}$ prior to insertion of the annular member into the interior volume of the tire.

8. The insert according to claim 1 wherein the rim and the base portion have lateral profiles and wherein the lateral profile of the base portion conforms to the lateral profile of the rim.

9. The insert according to claim 2 in which the upon insertion of the annular member into the interior volume of the tire the annular member applies an outward lateral force against the interior surface of the tire of at least 0.1 psi over the entire contact area to thereby laterally stabilize the tire.

10. The insert according to claim 2 in which $W_{AM}$ prior to insertion of the annular member into the interior volume of the tire is at least 1 mm greater than $W_{PT}$.

11. The insert according to claim 1 in which the width of the annular insert at all locations in the contact area is at least 1 mm greater than the width between the interior sidewalls of the tire at all locations in the contact area.

12. An insert for a pneumatic tire having an interior surface, a tread portion and opposed sidewalls with a width therebetween, comprising:
an annular member having a base portion, an outer portion and opposed sidewalls, the annular member adapted to be assembled with the tire so that the annular member contacts less than 80 percent of the interior surface of the tire and provide an outward pressure against the opposed sidewalls, and
wherein at all locations where the annular member contacts the interior surface of the tire when the annular member has been assembled with the tire, the annular member has a width that is greater than the width between the opposed sidewalls when measured prior to assembly of the annular member with the tire; and
wherein the annular member laterally stabilizes the tire sidewalls.

13. The insert according to claim 12, further comprising an inflatable bladder disposed radially outside of the annular member.

14. The insert according to claim 12 in which prior to assembly with the tire the annular member has a width $W_{AM}$ that is at least 1 mm greater than a width $W_{PT}$ between the opposed sidewalls.

15. A tire assembly comprising:
a pneumatic tire having opposed sidewalls with a width therebetween and interconnected by a tread portion and an interior surface interiorly of the sidewalls and the tread portion;
an annular foam member having opposed sidewalls contacting less than 80 percent of the interior surface the thereby define an area of contact between the foam member and the interior surface when the annular foam member is assembled with the tire, and wherein a width of the foam member over the entire area of contact prior to assembly with the tire is greater than the width between the opposed sidewalls over the entire area of contact so that the foam member exerts an outwardly directed pressure against the opposed sidewalls of at least 0.1 psi.

16. The tire assembly according to claim 15 wherein the foam member exerts an outwardly directed pressure against the opposed sidewalls of at least 0.1 psi over the entire area of contact to thereby laterally stabilize the sidewalls.

17. The tire assembly according to claim 15 adapted to be mounted to a rim and wherein the foam member has a base portion that conforms to the rim.

* * * * *